United States Patent
Itoh

(10) Patent No.: US 7,925,082 B2
(45) Date of Patent: Apr. 12, 2011

(54) INFORMATION PROCESSING APPARATUS, INFORMATION PROCESSING METHOD, COMPUTER READABLE MEDIUM, AND COMPUTER DATA SIGNAL

(75) Inventor: Atsushi Itoh, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1240 days.

(21) Appl. No.: 11/521,363

(22) Filed: Sep. 15, 2006

(65) Prior Publication Data

US 2007/0206851 A1 Sep. 6, 2007

(30) Foreign Application Priority Data

Mar. 3, 2006 (JP) ................................. 2006-057276

(51) Int. Cl.
*G06K 9/00* (2006.01)

(52) U.S. Cl. ......... 382/162; 382/165; 382/168; 382/176

(58) Field of Classification Search .................. 382/162, 382/165, 168, 176, 194, 270; 345/589, 593; 358/522, 515; 715/243; 348/453; 707/796, 707/915

See application file for complete search history.

(56) References Cited

U.S. PATENT DOCUMENTS

| | | | |
|---|---|---|---|
| 6,504,628 B1 * | 1/2003 | Kanno et al. | 358/522 |
| 6,771,813 B1 * | 8/2004 | Katsuyama | 382/165 |
| 7,280,688 B2 * | 10/2007 | Katsuyama | 382/165 |
| 7,349,571 B2 * | 3/2008 | Katsuyama | 382/162 |

FOREIGN PATENT DOCUMENTS

| | | |
|---|---|---|
| JP | A-04-024885 | 1/1992 |
| JP | A 5-342326 | 12/1993 |
| JP | A 10-255027 | 9/1998 |
| JP | A 11-272654 | 10/1999 |
| JP | A 2002-123815 | 4/2002 |
| JP | A 2003-18393 | 1/2003 |
| JP | A-2003-050970 | 2/2003 |
| JP | A 2003-271942 | 9/2003 |
| JP | A-2005-092543 | 4/2005 |

OTHER PUBLICATIONS

Jul. 6, 2010 Office Action issued in Japanese Patent Application No. 2006-057276 (with translation).

* cited by examiner

*Primary Examiner* — Anh Hong Do

(74) *Attorney, Agent, or Firm* — Oliff & Berridge, PLC

(57) ABSTRACT

An information processing apparatus includes: a color extraction unit that inputs an additional write document provided by writing additional write information to an original document in different colors and acquires color information on the additional write document; a color analysis unit that analyzes the correspondence between one of a color combination and color space generated by color mixture and the colors extracted based on the colors extracted; a joining and integrating unit that determines overlap between different colors on the additional write document based on the analysis result of the color analysis unit, and that joins the break of the additional write information corresponding to the correspondence portion between the overlap and the break of the additional write information; a determination unit that determines a specification area of the additional write document according to the additional write information joined; and an information analysis unit that reads information contained in the specification area analyzed.

19 Claims, 16 Drawing Sheets

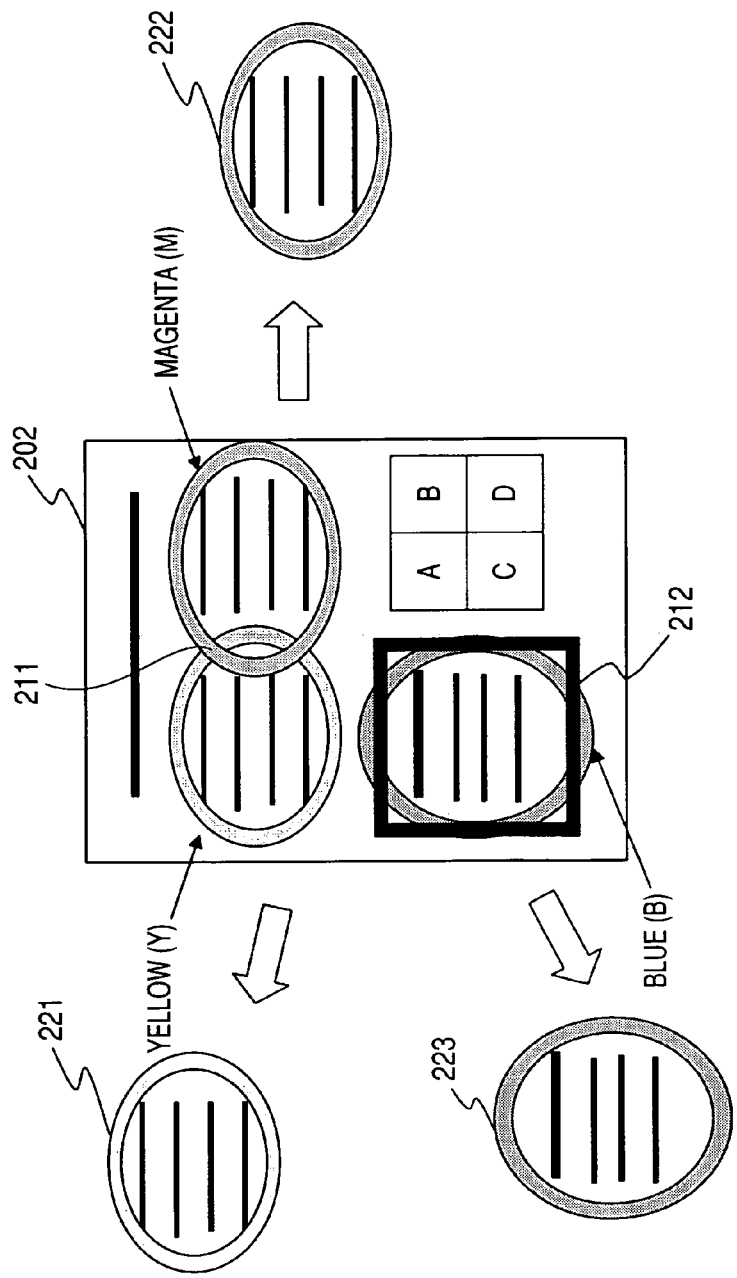

EXAMPLE WHEREIN ADDITIONAL WRITES OF TWO COLORS OVERLAP

FIG. 7A

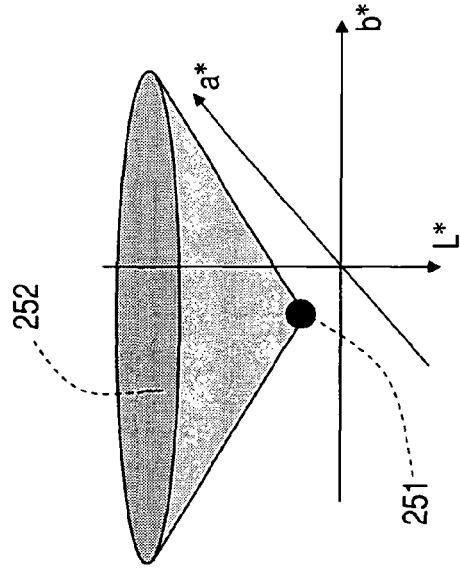

OCCURRENCE SITUATION OF SUBTRACTIVE COLOR MIXTURE IN CMYK (OR RGB) SPACE

EXTRACTION EXAMPLE 1 OF PARTIAL COLOR SPACE WITH POSSIBILITY OF SUBTRACTIVE COLOR MIXTURE FOR EXTRACTION COLOR

FIG. 7B

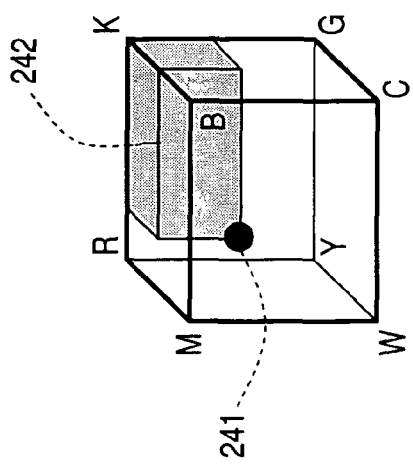

OCCURRENCE SITUATION OF SUBTRACTIVE COLOR MIXTURE IN Lab SPACE

EXTRACTION EXAMPLE 2 OF PARTIAL COLOR SPACE WITH POSSIBILITY OF SUBTRACTIVE COLOR MIXTURE FOR EXTRACTION COLOR

EXAMPLE OF BLACK TEXT AND ADDITIONAL WRITE OF SINGLE COLOR

TEXT IMAGE SURROUNDED BY ADDITIONAL WRITE AND TEXT IMAGE TOUCHING ADDITIONAL WRITE ARE EXTRACTED AND OCR CONVERSION IS EXECUTED AND TEXT INFORMATION IS STORED

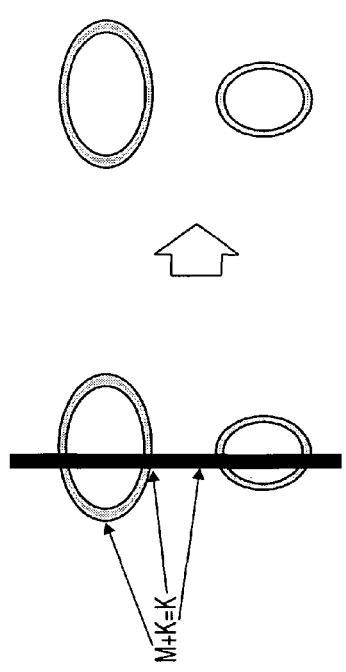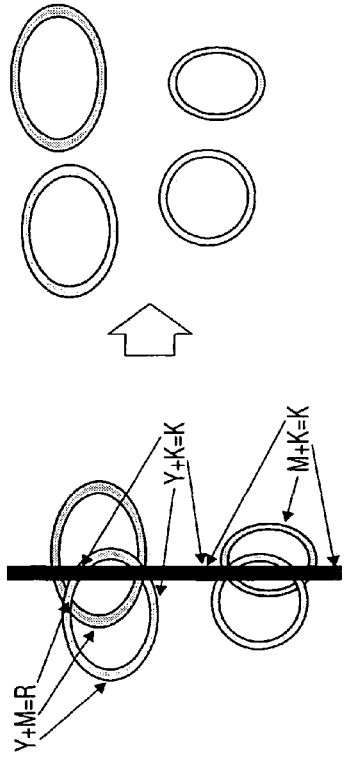

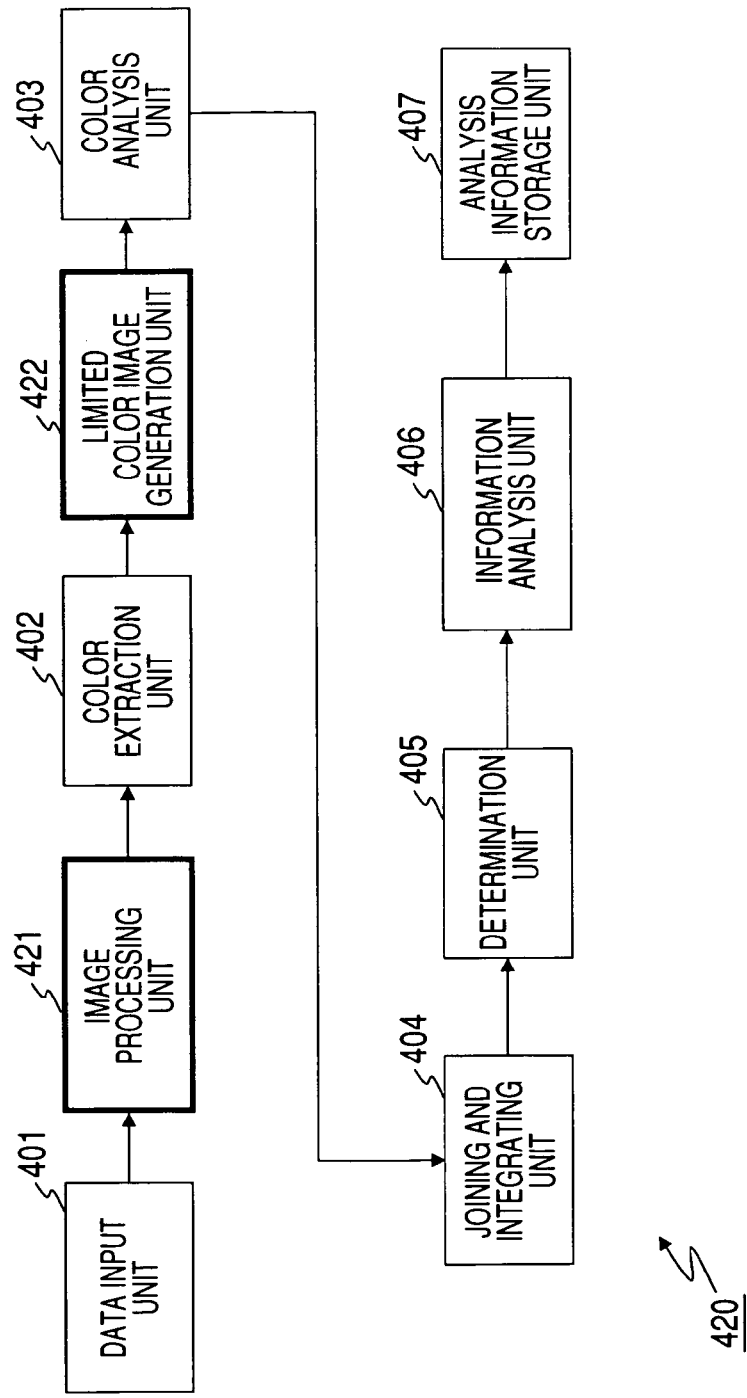

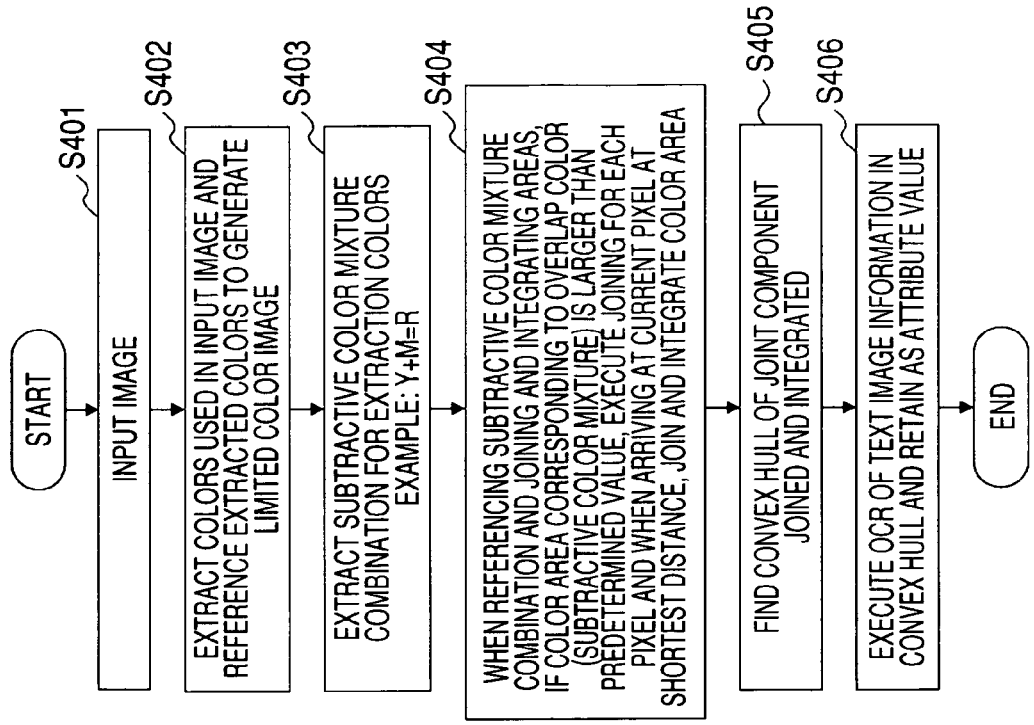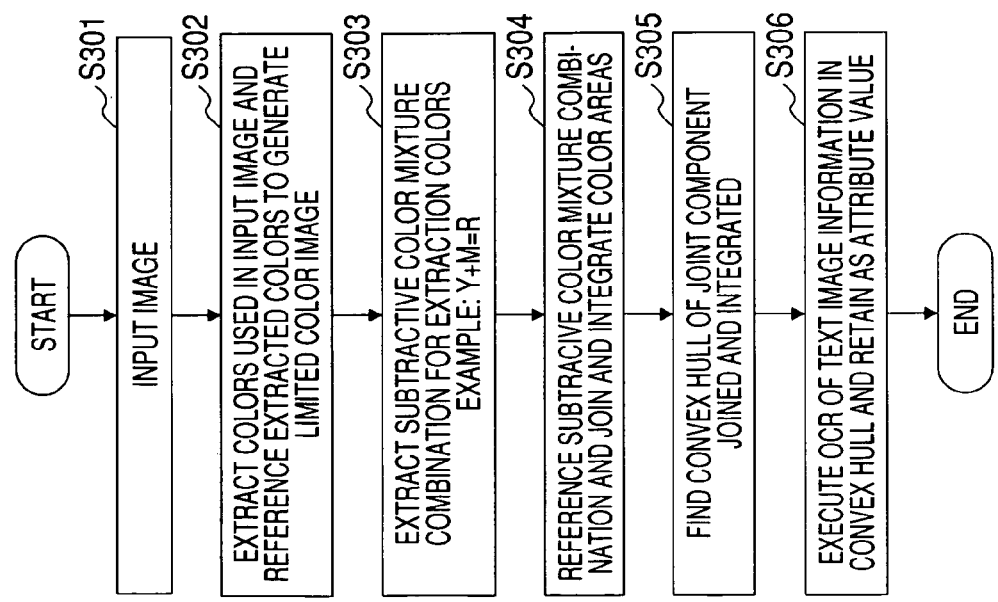

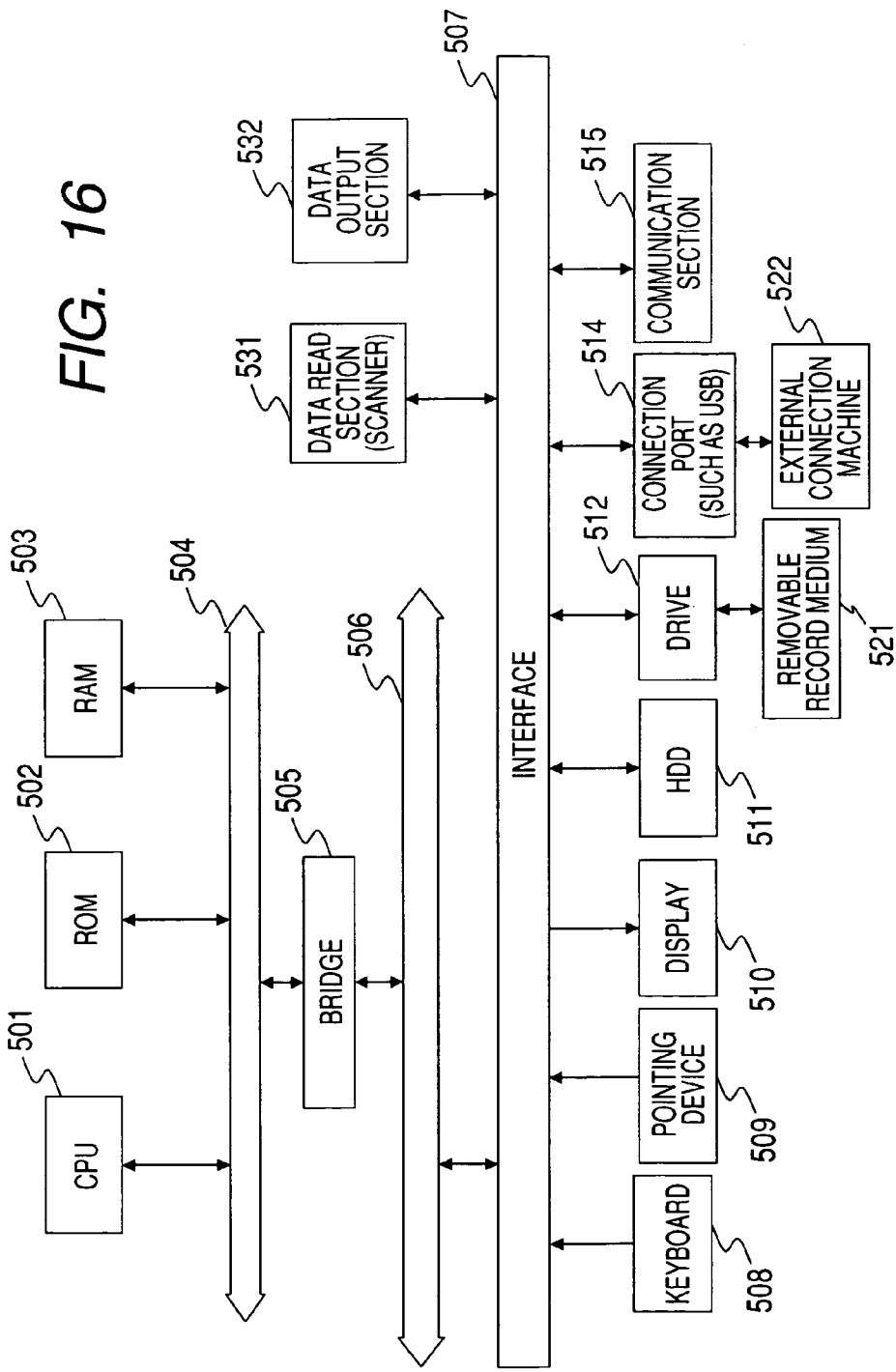

US 7,925,082 B2

INFORMATION PROCESSING APPARATUS, INFORMATION PROCESSING METHOD, COMPUTER READABLE MEDIUM, AND COMPUTER DATA SIGNAL

BACKGROUND

1. Technical Field

This invention relates to an information processing apparatus, an information processing method, and a computer program and more particularly to an information processing apparatus, an information processing method, and a computer program for making it possible to analyze overlap among plural pieces of additional write information or overlap between additional write information and original information in additional write with color markers and execute precise additional write area extraction.

2. Related Art

It is therefore an object of the invention to provide an information processing apparatus, an information processing method, and a computer program for making it possible to analyze overlap among a plural pieces of additional write information or overlap between additional write information and original information in additional write with color markers executed as attribute setting processing and execute precise additional write area extraction.

SUMMARY (1) According to a first aspect of the invention, an information processing apparatus comprising: a color extraction unit that inputs an additional write document provided by writing additional write information to an original document in different colors and acquires color information on the additional write document; a color analysis unit that analyzes the correspondence between one of a color combination and color space generated by color mixture and the colors extracted by the color extraction unit based on the colors extracted by the color extraction unit; a joining and integrating unit that determines overlap between different colors on the additional write document based on the analysis result of the color analysis unit, and that joins the break of the additional write information corresponding to the correspondence portion between the overlap and the break of the additional write information; a determination unit that determines a specification area of the additional write document according to the additional write information joined in the joining and integrating unit; and an information analysis unit that reads information contained in the specification area analyzed by the determination unit.

BRIEF DESCRIPTION OF THE DRAWINGS

An exemplary embodiment of the present invention will be described in detail based on the following figures, wherein:

FIG. 5 is a drawing to describe a data processing example for documents using the additional write part indexing processing executed by the information processing apparatus of the invention;

FIGS. 7A and 7B are drawings to describe the occurrence situation of subtractive color mixture;

FIGS. 9A1, 9A2, 9B1, and 9B2 are drawings to describe a data processing example for documents using the additional write part indexing processing executed by the information processing apparatus of the invention;

FIG. 12 is a block diagram to show a configuration example of the information processing apparatus of the invention;

FIGS. 13A and 13B are flowcharts to describe processing sequences executed by the information processing apparatus of the invention;

FIG. 16 is a block diagram to show a hardware configuration example of the information processing apparatus of the invention.

DETAILED DESCRIPTION

An information processing apparatus, an information processing method, and a computer program according to an embodiment of the invention will be discussed with reference to the accompanying drawings.

Figure 2:
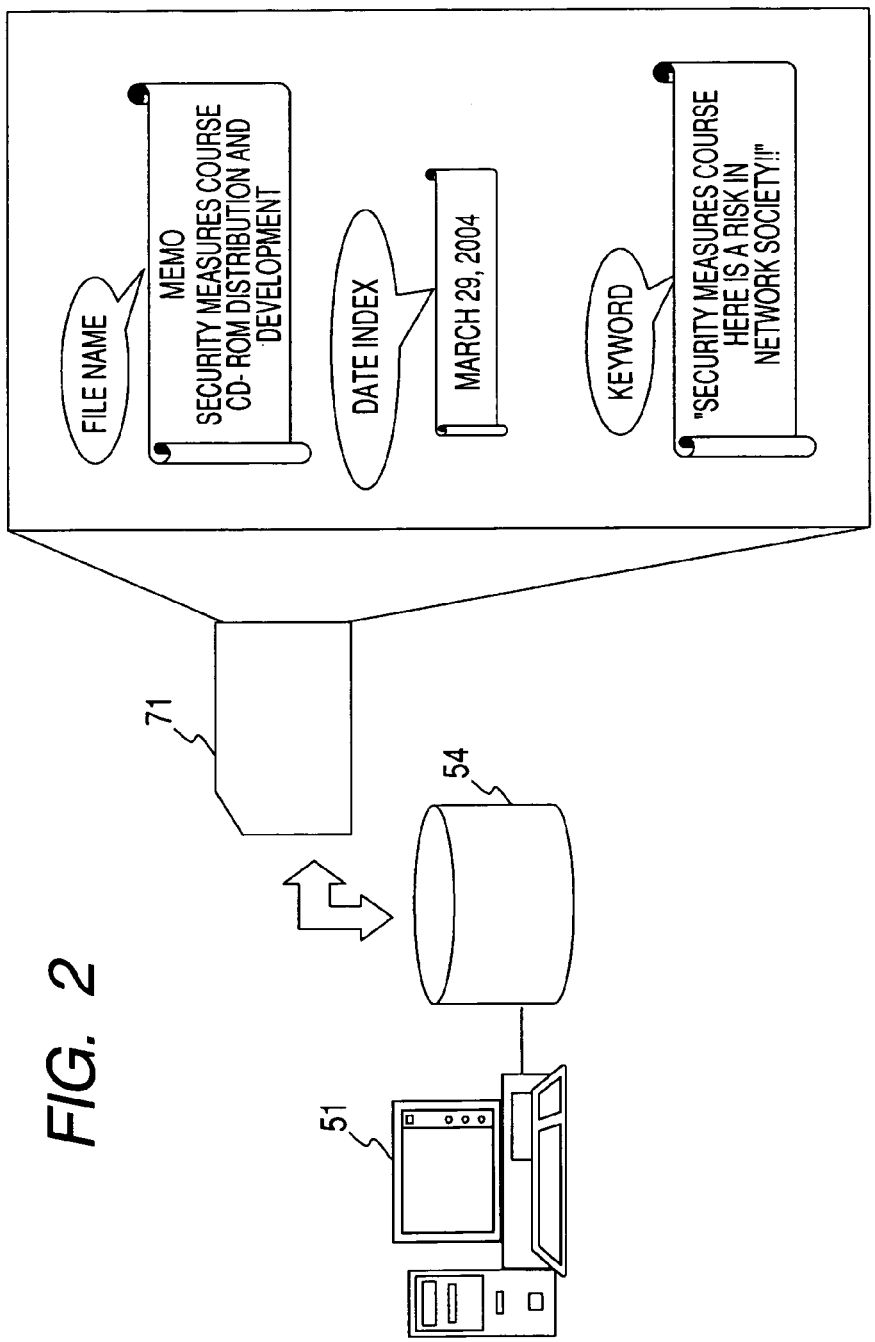
FIG. 2 is a drawing to describe an index setting example using the additional write part indexing processing.
Figure 3:
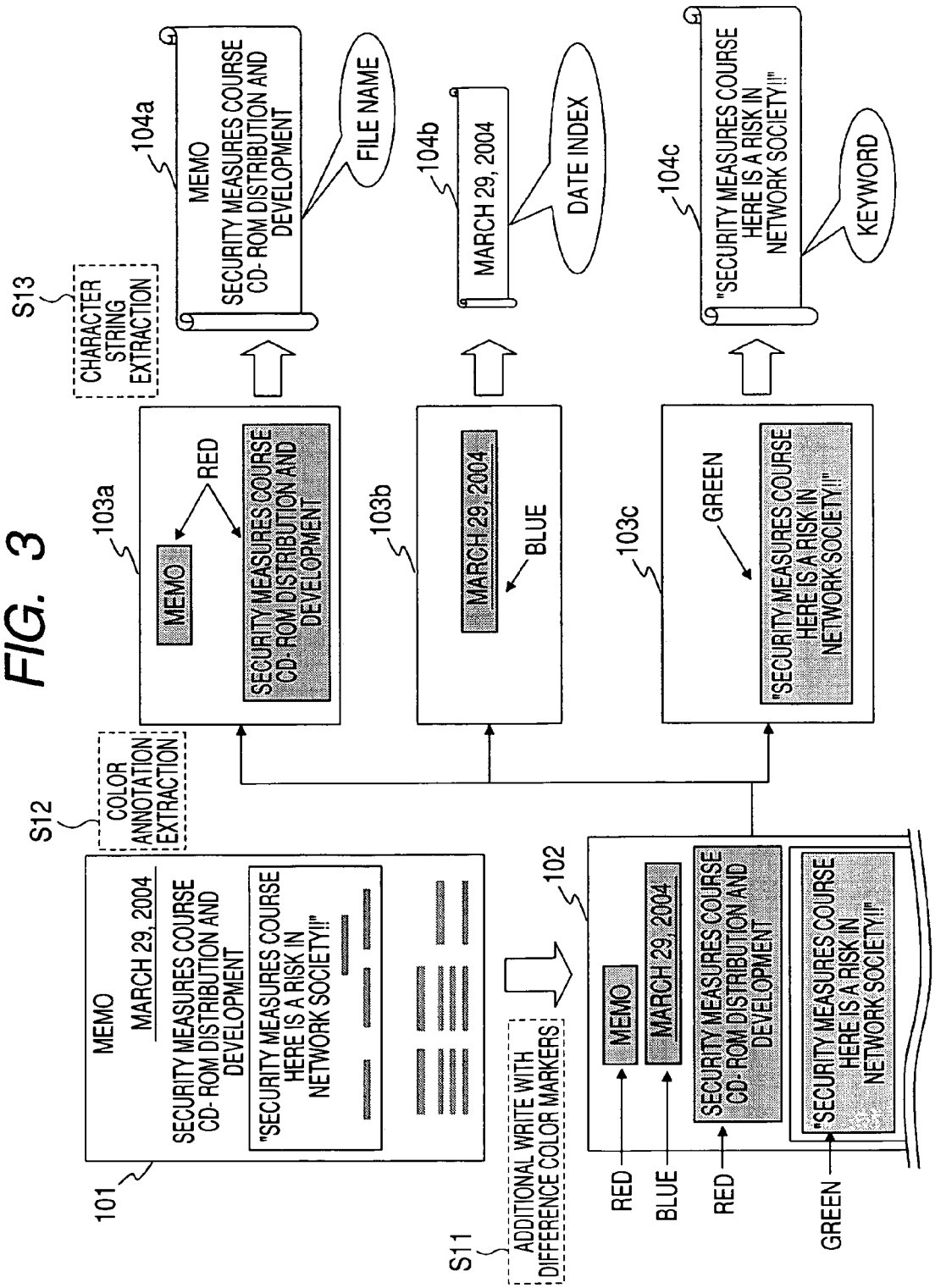
FIG. 3 is a drawing to describe a general processing example of data processing for documents using the additional write part indexing processing.

To begin with, a general processing example of document processing using additional write part indexing processing will be discussed with reference to FIGS. 1 to 3. The additional write part indexing processing is as follows: For example, the operator performs processing of checking information of a character string, etc., on a document with a marker of a specific color set in response to the category, the post-processed document is read through a scanner, the marker color is judged from the read image data, the information on the document is classified, and the index information for the document is stored in a database.

For example, the marker color to be used is previously related in response to the information type as follows:

Red: File name,
Blue: Date,
Green: Keyword, etc., and the operator selects information corresponding to the information type out of the document and checks the selected information with the marker assigned to the information type. Then, an information processing apparatus such as a PC acquires marker color information from the image data read through a scanner, converts document information of the indication part of the color information or the like into data by performing character recognition (OCR) processing, etc., for example, and stores the data in a database as index information corresponding to the document.

Figure 1:
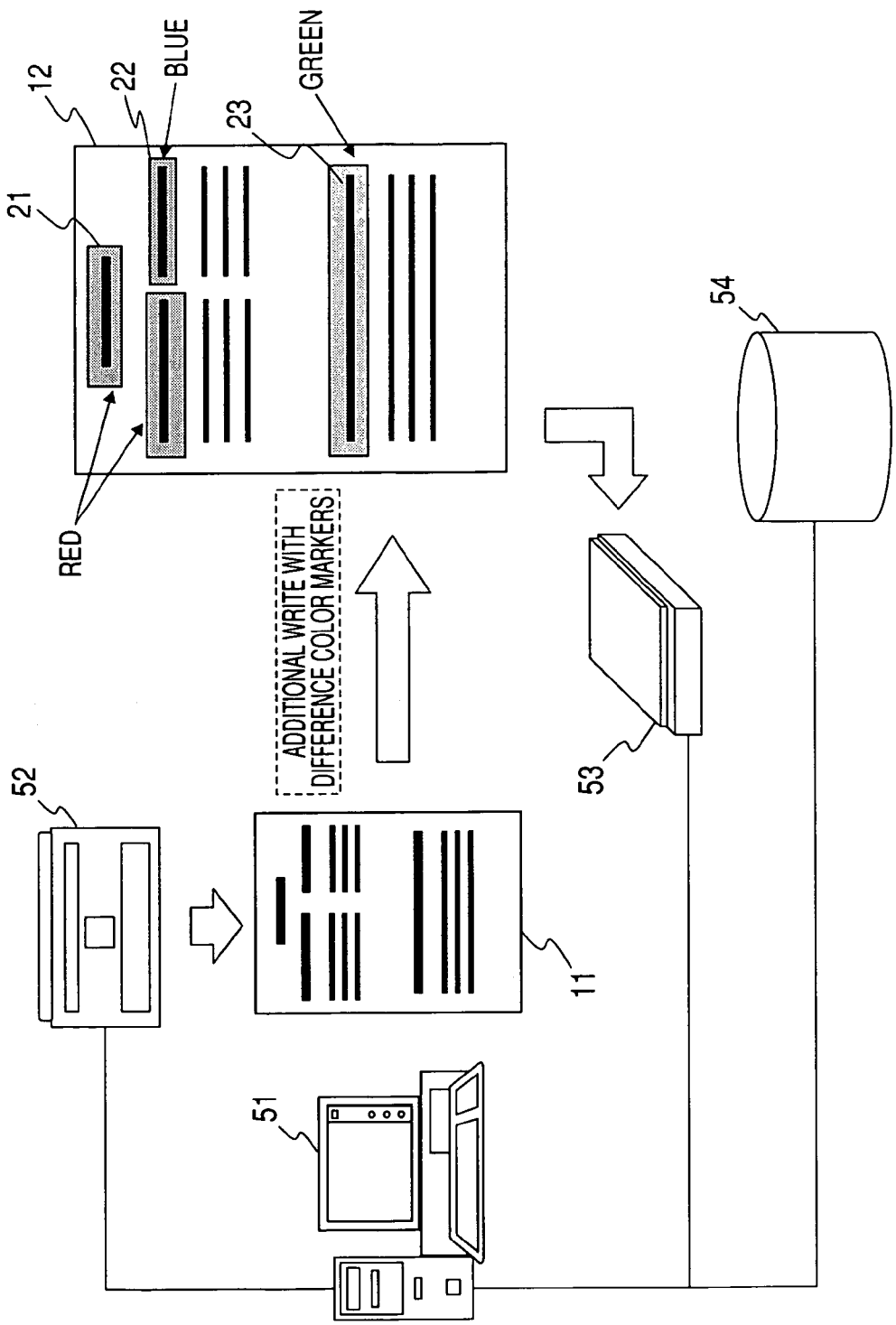
FIG. 1 is a drawing to describe a general processing example of data processing for documents using additional write part indexing processing.

For example, an information processing apparatus 51 shown in FIG. 1 outputs a document stored in a database 54 through a printer 52. The document is an original document 11 shown in the figure. The operator executes additional write to the original document 11 with markers based on the preset correspondence between the information types and the used marker colors. The result is an additional write document 12 shown in the figure.

For example, red, blue, and green markings 21 to 23 are put on the additional write document based on a predetermined rule. For example, the correspondence between the marker colors and the information types is set as
  Red: File name,
  Blue: Date,
  Green: Keyword.
The additional write document 12 is read through a scanner 53 and the information processing apparatus 51 performs data processing and performs setting processing of index information corresponding to the document to be processed.

The index setting processing executed in the information processing apparatus 51 will be discussed with reference to FIG. 2. A document data file 71 corresponding to the original document 11 previously described with reference to FIG. 1 is stored in the database 54 and the information processing apparatus 51 extracts the index information corresponding to the original document 11 based on the additional write document 12 previously described with reference to FIG. 1 and stores the index information in the database 54 as the index information corresponding to the document.

The information processing apparatus 51 reads information from the additional write document 12 based on the correspondence information between the marker colors and the information types, namely,
  Red: File name,
  Blue: Date,
  Green: Keyword
and acquires the index information shown in FIG. 2 by using character recognition processing (OCR), etc., in combination. In the example shown in the figure, the following index information pieces
  (1) Marker color=red->file name: "Memo," "Security measures course CD-ROM distribution and development"
  (2) Marker color=blue->date: "Mar. 29, 2004"
  (3) Marker color=green->keyword: "Security measures course Here is a risk in network society!!"
are extracted from the additional write document 12 and are stored in the database 54 as the index information of the document.

A sequence of the index giving processing will be discussed with reference to FIG. 3. A document 101 shown in FIG. 3 is a document to which index extraction processing is applied. At step S11, the operator executes marker additional write to the document 101 using the marker colors predetermined corresponding to the information types to generate a marker additional write document 102.

The information processing apparatus 51 reads the marker additional write document 102 through the scanner and executes data processing (color annotation extraction processing at step S12).

The information processing apparatus 51 extracts information from the marker additional write document 102 based on the correspondence information
  Red: File name,
  Blue: Date,
  Green: Keyword.
As shown in the figure,
  (1) Red marker record data 103*a*
  (2) blue marker record data 103*b*
  (3) green marker record data 103*c*
are extracted.

The information processing apparatus 51 executes character string extraction from the extracted data at step S13 and acquires the following index information
  (1) Index data 104*a*=[Marker color=red->file name: "Memo," "Security measures course CD-ROM distribution and development"]
  (2) Index data 104*b*=[Marker color=blue->date: "Mar. 29, 2004"]
  (3) Index data 104*c*=[Marker color=green->keyword: "Security measures course Here is a risk in network society!!"] as shown in the figure and stores the index information in the database as the index information of the document 101.

Thus, it is made possible to classify or categorize various pieces of data contained in the document for each type and store the index information corresponding to the document in the storage section of the database, etc. In the processing, the human being (operator) enters markers. As described above, however, if write is added to an original using various color markers, overlap between different marker colors as additional write information may occur and further overlap between the marker color as additional write and the original information may occur. In the overlap occurrence part between different colors, at the reading time through the scanner, the essential marker color is read as a different color. Therefore, if such an original is read, precise marker color extraction is not executed in the overlap and determination of the additional write area based on the marker color is not precisely executed; this is a problem.

The invention has a configuration solving such a problem. That is, in additional write with color markers executed as attribute setting processing, it is made possible to analyze overlap among plural pieces of additional write information as different marker colors or overlap between additional write information and original information and precisely extract an additional write area. Processing executed by the information processing apparatus 51 of the invention will be discussed in detail with reference to FIG. 4 and the later figures.

Figure 4:
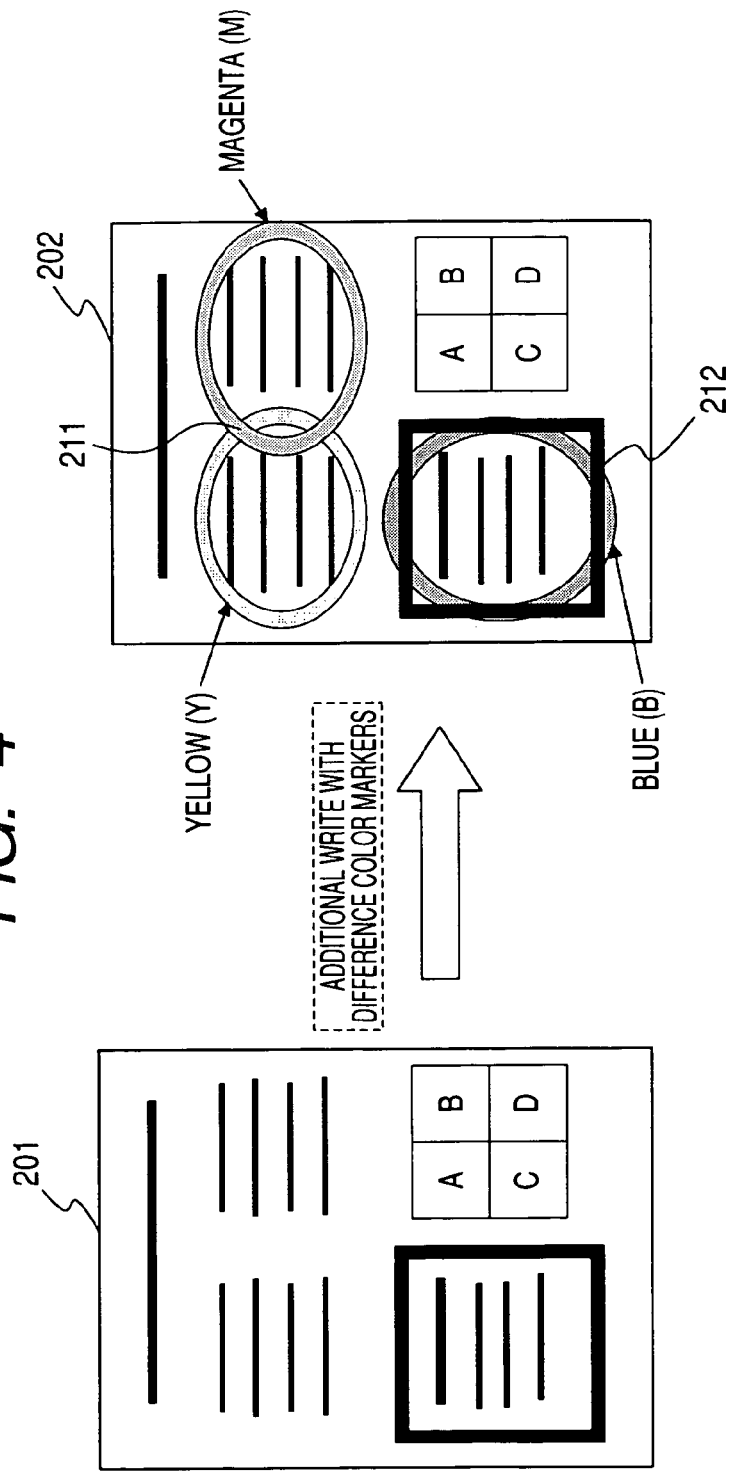
FIG. 4 is a drawing to describe a data processing example for documents using the additional write part indexing processing executed by an information processing apparatus of the invention.

FIG. 4 is a drawing to describe a specific example of occurrence of overlap among plural pieces of additional write information as different marker colors or overlap between additional write information and original information in additional write with color markers executed as attribute setting processing for documents.

The operator checks an original document 201 shown in FIG. 4 as attribute setting using various color markers. Here, an example of performing processing of surrounding a document area corresponding to a specific attribute (for example, date, filename, keyword, etc.,) with the color marker associated with each attribute is shown. In the example shown in FIG. 4, the marker colors are yellow (Y), magenta (M), and blue (B) and the color of the original is black (K).

The attribute giving result using markers by the operator is an additional write document 202. The additional write document 202 is checked with the color markers of yellow (Y), magenta (M), and blue (B). However, additional write information overlap 211 of overlap between different marker colors and additional write and original information overlap 212 of overlap between the marker color and the original information of the original occur in the additional write document 202 with the marker additional write.

In the additional write information overlap 211 and the additional write and original information overlap 212, the marker color as the essential additional write information cannot be identified when the additional write document original is read through the scanner. Consequently, it becomes impossible to precisely keep track of the specification area with the marker color.

Essentially, it is necessary to precisely read the following three specification areas yellow (Y) marker color specification area 221,
magenta (M) marker color specification area 222, and
blue (B) marker color specification area 223 from the additional write document 202 as shown in FIG. 5, perform OCR processing for the text information in the three areas, and store in the storage section of the database, etc., as the index information corresponding to each attribute. However, at the reading time through the scanner, the essential marker color is not detected in the additional write information overlap 211 or the additional write and original information overlap 212 and it becomes difficult to keep track of the specification area with the marker.

Figure 6B:
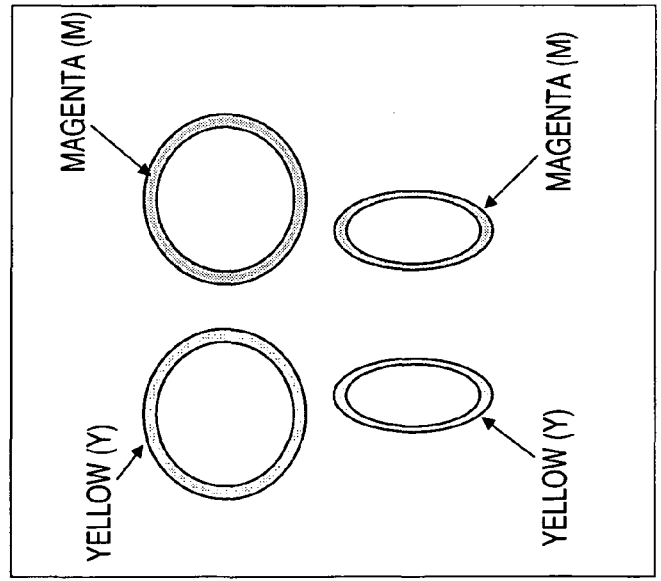
FIGS. 6A and 6B are drawings to describe a data processing example for documents using the additional write part indexing processing executed by the information processing apparatus of the invention.

The information processing apparatus 51 of the invention analyzes the additional write information overlap 211 and the additional write and original information overlap 212 and makes it possible to detect the essential marker color. Analysis processing examples will be discussed with reference to the accompanying drawings. FIG. 6 is a drawing to describe processing of discriminating additional write areas of different marker colors from each other based on the color analysis of overlap between different marker colors.

Figure 6A:
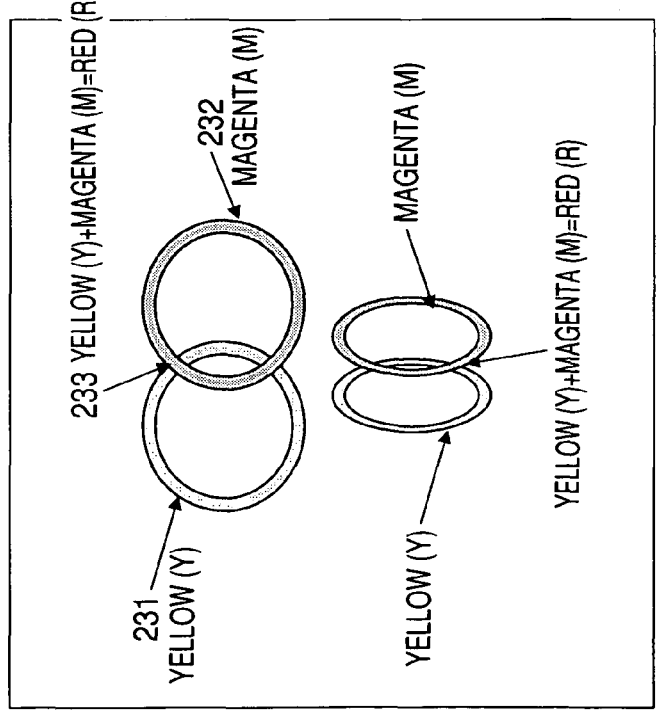

FIG. 6A shows an example wherein overlap occurs when yellow (Y) and magenta (M) are used as two different marker colors. As shown in FIG. 6A, a yellow (Y) marker additional write area 231 and a magenta (M) marker additional write area 232 are set and overlap 233 occurs in the two additional write information pieces.

The overlap 233 is identified as red (R) when the original is read through the scanner. That is, it is identified as red (R) according to $$yellow(Y)+magenta(M)=red(R).$$

Assume that the color information read through the scanner is the original information color previously used for the original (for example, black) and the marker colors used for additional write, here, yellow (Y) and magenta (M). That is, basically the color information read through the scanner is any of the three colors of black (K), yellow (Y), magenta (M) as a rule.

If any color other than the essential used colors is detected from the scanner-read original, the information processing apparatus 51 of the invention determines that the color is a color generated by mixing colors and analyzes which colors are mixed based on the detected color.

In the example shown in FIG. 6, red (R) is detected in the overlap 233. The information processing apparatus 51 of the invention analyzes which of the three colors of black (K), yellow (Y), and magenta (M) are mixed to generate red (R) of the detected color. The information processing apparatus 51 retains the original and used color information as additional write markers (for example, black, yellow, magenta) in the storage section and makes a comparison between the used color information and the color information read through the scanner to analyze which used colors are mixed to generate the detected color (red) not contained in the used color information (for example, black, yellow, magenta)

In the example shown in FIG. 6, red (R) is detected in the overlap 233. Red (R) is analyzed as a color generated by mixing yellow (Y) and magenta (M). That is, it is determined that $$red(R)=yellow(Y)+magenta(M)$$

and the overlap 233 is determined overlap between the yellow (Y) marker and the magenta (M) marker. The color analysis based on the detected color is conducted in accordance with the previously stipulated rule.

The information processing apparatus 51 may previously retain a correspondence table between color information detected by the scanner and plural used colors contained in the detected color information in the storage section of the information processing apparatus 51 and may analyze the used colors based on the detected color using the correspondence table or may execute color separation processing based on the detected color and may analyze the actually used colors in sequence. To generate the table or conduct the color analysis, subtractive color mixture area information in color space known in the color analysis field can be applied.

The subtractive color mixture will be discussed with reference to FIG. 7. FIG. 7 is a drawing to describe the occurrence situation of subtractive color mixture in different color spaces as (1) occurrence situation of subtractive color mixture in CMYK (or RGB) space; and
(2) occurrence situation of subtractive color mixture in Lab space.

In FIG. 7 (1) showing the occurrence situation of subtractive color mixture in the CMYK (or RGB) space, vertexes indicate C (cyan), M (magenta), Y (yellow), K (black), R (red), G (green), B (blue), and W (white). For example, an extraction color 241 shown in the figure is adopted as an extraction color. The area of a color generated if any other color is mixed with the extraction color is the area indicated by a rectangular parallelepiped shown in the figure as a partial color space 242 with a possibility of subtractive color mixture.

That is, the partial color space with a possibility of subtractive color mixture is indicated by the rectangular parallelepiped with the line connecting the extraction color and black (K) as a diagonal line. Therefore, for example, if a color not used as the original or additional writer marker color is obtained from scanner read information, the mixed color can be analyzed inversely from the partial color space with a possibility of subtractive color mixture.

For example, if it is assumed that when the color read through the scanner is red (R), red (R) is generated by subtractive color mixture, it can be determined that the mixed color exists on a plane of M (magenta), Y (yellow), R (red), and W (white). For example, if the colors used as the original and the marker are M (magenta) and Y (yellow), it is determined that R (red) is a color generated by mixing M (magenta) and Y (yellow), and it can be determined that R (red) detected by the scanner is generated by mixing M (magenta) and Y (yellow).

FIG. 7 (1) is a drawing to show the occurrence situation of subtractive color mixture in the CMYK (or RGB) space; not only in the CMYK (or RGB) space, but also in the Lab space, as shown in FIG. 7 (2), a conic area shown in the figure as the area of a color generated if any other color is mixed with an extraction color 251 can be defined as a partial color space 252 with a possibility of subtractive color mixture. Thus, a partial color space with a possibility of subtractive color mixture can be defined separately in various color spaces of CMYK, RGB, Lab, etc., and various settings of the color information analyzed from the scanner read information can be used.

The subtractive color mixture area information described above is applied, whereby the information processing apparatus 51 of the invention generates the correspondence table between the color information detected by the scanner and plural used colors contained in the detected color information and previously retains the correspondence table in the storage section of the information processing apparatus 51 and analyzes the used colors based on the detected color using the correspondence table. Alternatively, the information processing apparatus 51 executes color separation processing based on the detected color by applying the subtractive color mixture area information described above and analyzes the actually used colors in sequence. In either case, it is necessary to previously acquire the used color information of the original and additional write information used in the read original.

Figure 8A:
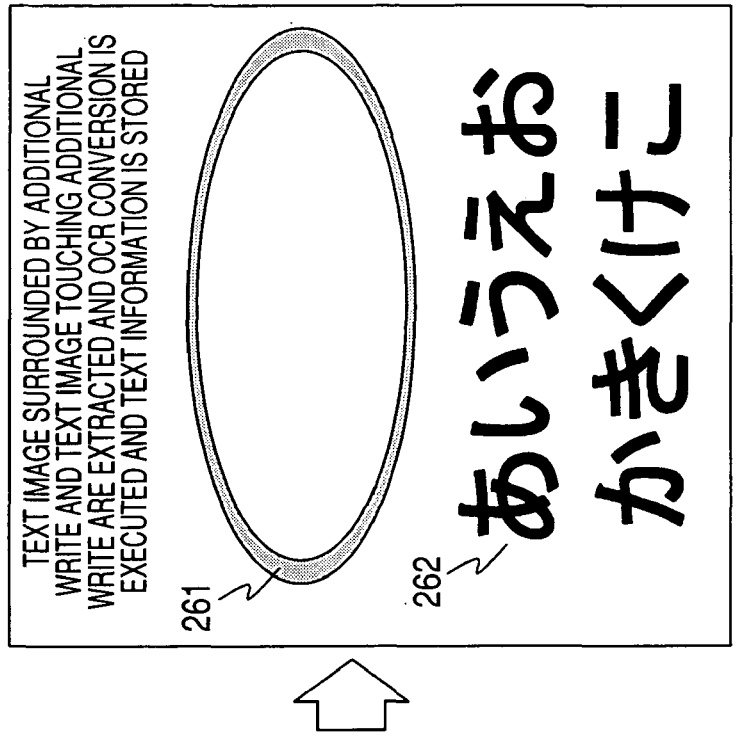
FIGS. 8A and 8B are drawings to describe a data processing example for documents using the additional write part indexing processing executed by the information processing apparatus of the invention.

The color analysis when overlap between additional write information pieces of different colors occurs has been described with reference to FIG. 6. When write is added to a document with a color marker, overlap between the color marker and the original information also occurs. That is, for example, overlap between original information=black (K) and additional write marker color=magenta (M) or the like occurs as shown in FIG. 8A.

Also in this case, analysis applying the subtractive color mixture area information described above is conducted or analysis is conducted based on the correspondence table between the detected color information and plural used colors contained in the detected color information. As shown in the figure, $$\text{magenta}(M)+\text{black}(K)=\text{black}(K)$$

Figure 8B:
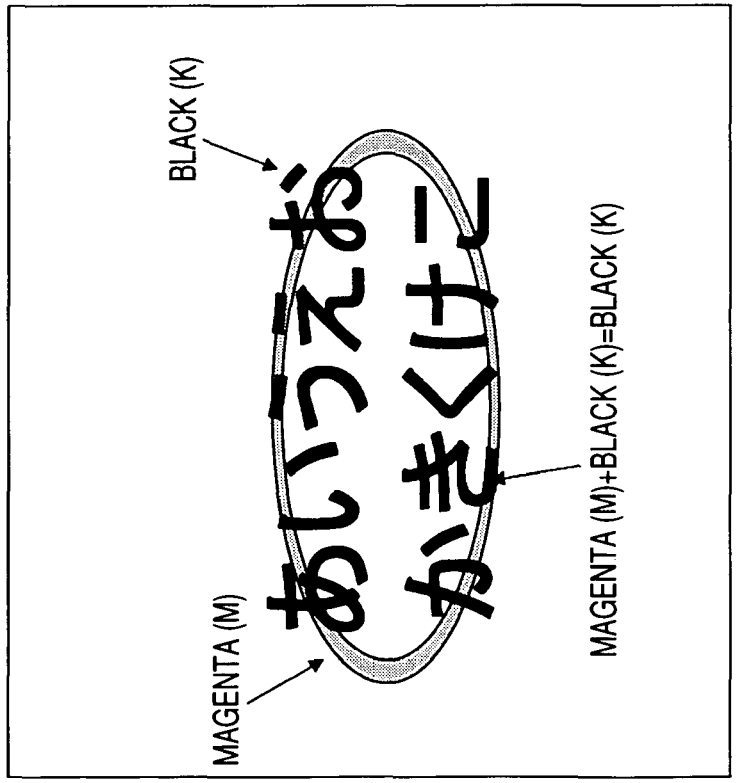

In this case, the overlap between original information=black (K) and additional write marker color=magenta (M) becomes black (K), the same as the original information. The information processing apparatus 51 detects a break of the additional write area and if the break is set to the above-mentioned condition color, for example, $$\text{magenta}(M)+\text{black}(K)=\text{black}(K),$$

the information processing apparatus 51 determines that the detected break is overlap between magenta (M) and black (K) and executes processing of connecting the break by the additional write color, magenta (M) to recover to additional write information 261 with no break as shown in FIG. 8 (2), acquiring original information 262 contained in the portion specified by the recovered additional write information (inclusive area and overlap), and extracting the original information as information having the attribute specified by the additional write information 261.

The information processing apparatus 51 of the invention performs such analysis processing, thereby executing color analysis of the overlap between additional write information and any other information (original information or any other additional write information) and precisely acquiring the exact additional write information area corresponding to the essential used color and the original information specified by the additional write.

FIG. 9 shows detection processing examples of an additional write information record area based on color analysis in
(1) example wherein black line and additional write of single color overlap
(2) example wherein black line and additional write of two colors overlap In the example in FIG. 9 (1), for example, black (K) as original information and magenta (M) as additional write information are used and overlap between black (K) and magenta (M) becomes $$\text{magenta}(M)+\text{black}(K)=\text{black}(K)$$

and magenta (M) as additional write information is acquired as break information from scanner read information. The information processing apparatus 51 determines whether or not the break of the additional write information in magenta (M) is a color corresponding to color information generated by subtractive color mixture described above based on the used colors (magenta (M) and black (K)). If the information processing apparatus 51 determines that it is a color with a possibility of occurrence, the information processing apparatus 51 determines that the area is an area occurring due to overlap between used colors, namely, in the example, is black (K) generated by mixing $$\text{magenta}(M)+\text{black}(K)=\text{black}(K)$$

and determines that the detected break is overlap between magenta (M) and black (K) and executes processing of connecting the break by the additional write color, magenta (M) to recover to additional write information with no break as shown in FIG. 9 (1b), acquiring original information contained in the portion specified by the recovered additional write information (inclusive area and overlap), and registering the original information as information having the attribute corresponding to the additional write color in the storage section (database).

In the example in FIG. 9 (2), for example, black (K) as original information and magenta (M) and yellow (Y) as additional write information are used. In the example, the following three different overlaps occur:
(a) overlap between yellow (Y) and magenta (M)->yellow (Y)+magenta (M)=red (R); (b) overlap between yellow (Y) and black (K)->yellow (Y)+black (K)=black (K); and
(c) overlap between magenta (M) and black (K)->magenta (M)+black (K)=black (K).

Magenta (M) and yellow (Y) as additional write information are acquired as break information from scanner read information. The information processing apparatus 51 determines whether or not the break of the additional write information in magenta (M) and yellow (Y) is a color corresponding to color information generated by subtractive color mixture described above based on the used colors (magenta (M), yellow (Y), and black (K)). If the information processing apparatus 51 determines that it is a color with a possibility of occurrence, the information processing apparatus 51 determines that the area is an area occurring due to overlap between used colors.

In the example, if the break of the additional write information of magenta (M) is black (K) generated by mixing $$\text{magenta}(M)+\text{black}(K)=\text{black}(K),$$

the detected break is determined overlap between magenta (M) and black (K) and the break is connected by the additional write color, magenta (M).

Likewise, if the break of the additional write information of yellow (Y) is black (K) generated by mixing $$\text{yellow}(Y)+\text{black}(K)=\text{black}(K),$$

the detected break is determined overlap between yellow (Y) and black (K) and the break is connected by the additional write color, yellow (Y).

The detection part of red (R) not contained in the used colors is determined a color generated by subtractive color mixture described above and since $$yellow(Y)+magenta(M)=red(R),$$

the former color information mixed in the detection part of red (R) is determined yellow (Y) and magenta (M) and the area is determined the overlap area between yellow (Y) and magenta (M).

Based on the analysis, processing of recovering to additional write information with no break as shown in FIG. 9 (2b), acquiring original information contained in the portion specified by the recovered additional write information (inclusive area and overlap), and registering the original information as information having the attribute corresponding to the additional write color in the storage section (database) is executed.

Figure 10:
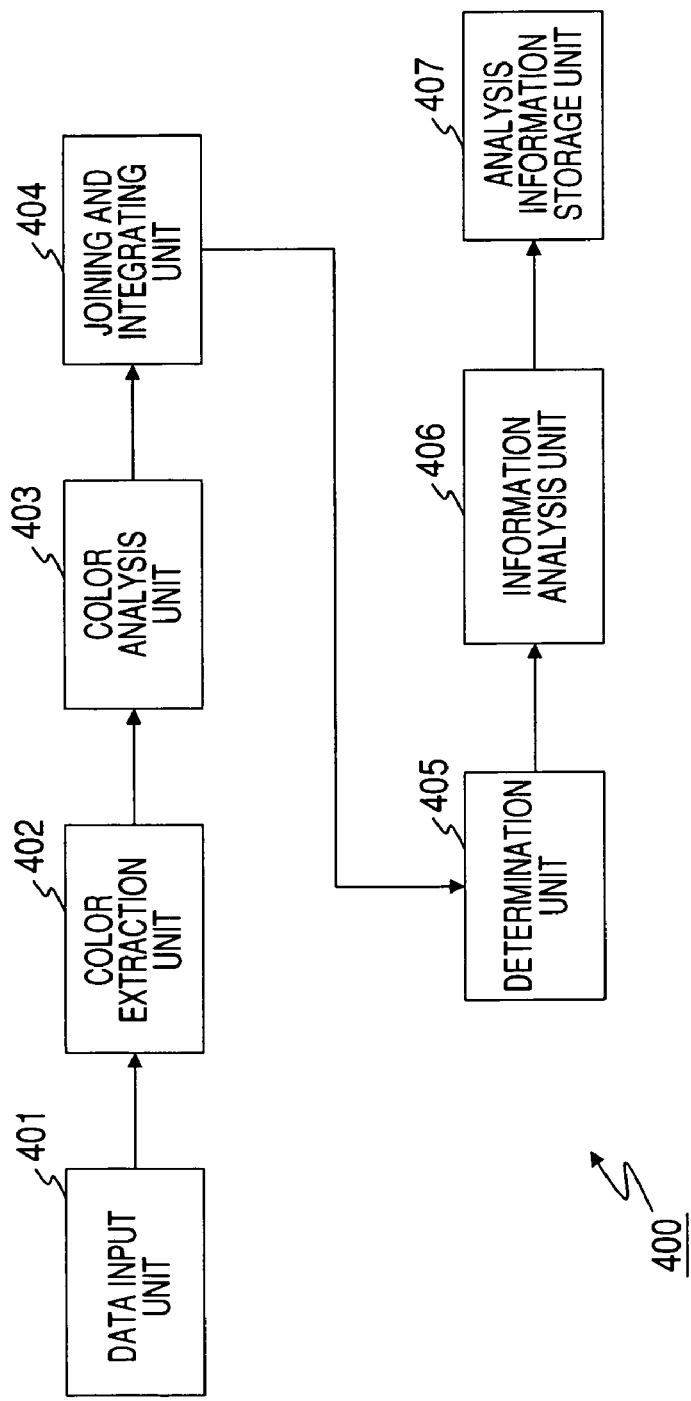
FIG. 10 is a block diagram to show a configuration example of the information processing apparatus of the invention.

Next, the configuration of one embodiment of the information processing apparatus of the invention will be discussed with reference to FIGS. 10 and 11. FIG. 10 is a block diagram to show the configuration of one embodiment of the information processing apparatus of the invention, and FIG. 11 is flowcharts corresponding to processing examples executed in the information processing apparatus shown in FIG. 10.

An information processing apparatus 400 has data an input unit 401, a color extraction unit 402, a color analysis unit 403, a joining and integrating unit (hereinafter also simply referred to as an "additional write area joining and integrating unit") 404, a determination unit (hereinafter also simply referred to as an "additional write area specification part determination unit") 405, information analysis unit (hereinafter also simply referred to as an "additional write area specification part information analysis unit") 406, and an analysis information storage unit 407, as shown in FIG. 10. Processing examples in the information processing apparatus 400 having the configuration will be discussed with reference to the flowcharts of FIG. 11.

Figure 11B:
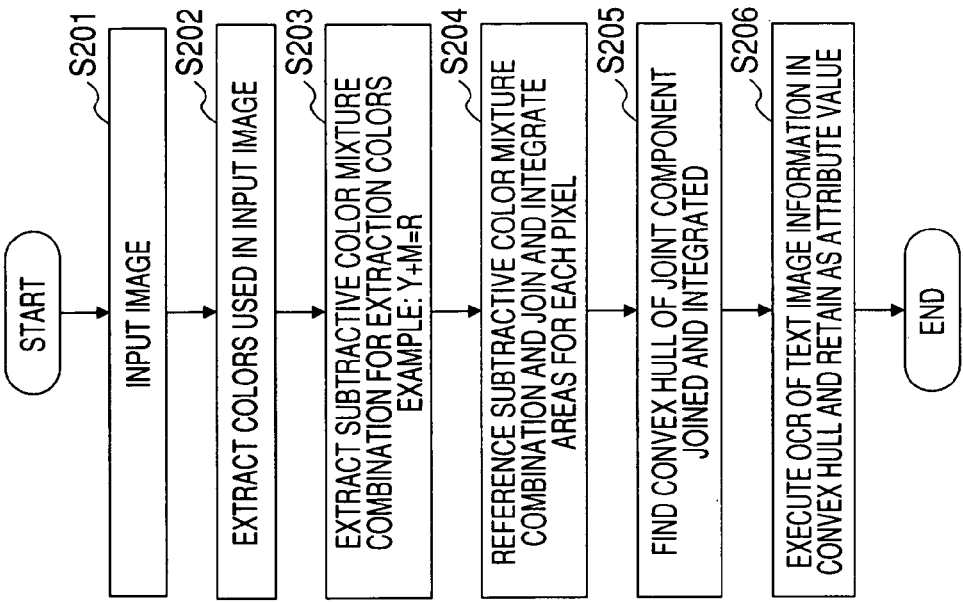
FIGS. 11A and 11B are flowcharts to describe a processing sequence executed by the information processing apparatus of the invention.
Figure 11A:
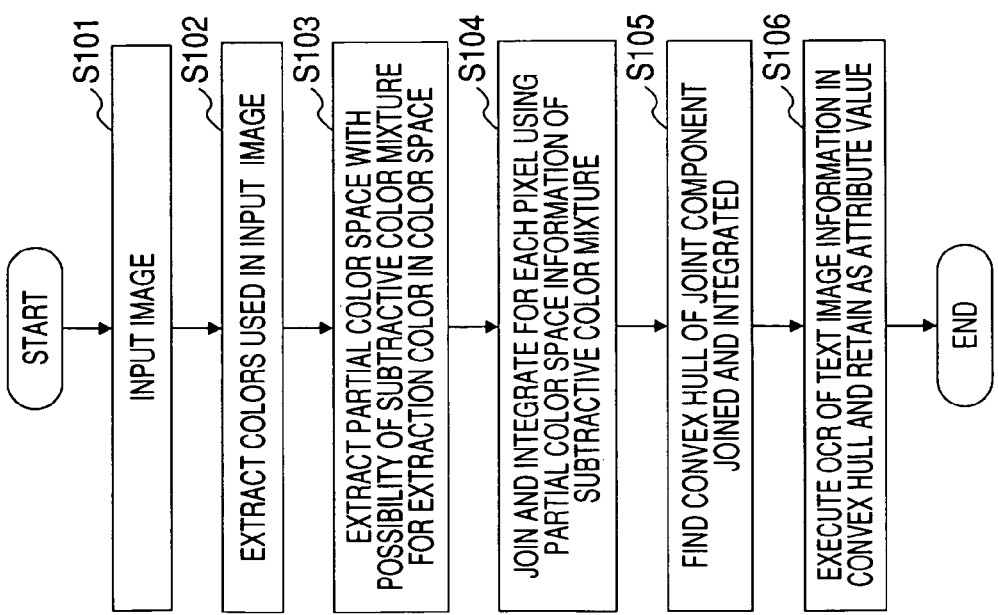

FIG. 11 provides two flowcharts corresponding to two processing sequences. To begin with, the processing example according to the flowchart of FIG. 11A will be discussed. First, at step S101, the data input unit 401 shown in FIG. 10 inputs image data to be processed. For example, the image data is document image data with attributes set with different color markers, namely, checked with markers; data read through the scanner, image data stored in the storage section, or the like is input as the data to be processed.

At step S102, the color extraction unit 402 extracts the colors used in the input image data. For example, black (K) used in original information and yellow (Y) and magenta (M) used as additional write information are extracted.

At step S103, the color analysis unit 403 extracts each partial color space with a possibility of subtractive color mixture for the colors extracted at step S102 in the color space (color space of YMCK, GBR, etc.,). For example, if
black (K) as original information and
yellow (Y) and magenta (M) as additional write information are used, for example, extraction color 241 is set to black (K), yellow (Y), and magenta (M) in the color space shown in FIG. 7 (1) and each partial color space with a possibility of subtractive color mixture is found and becomes the target color area at the joining and recovering time. For example, red (R) becomes the target color area at the joining and recovering time of yellow (Y) and magenta (M).

Next, at step S104, the additional write area joining and integrating unit 404 joins and integrates for each pixel using the partial color space information of subtractive color mixture. If black (K), yellow (Y), and magenta (M) are used colors, the colors generated by subtractive color mixture are black (K) and red (R) areas from the following relational expressions:

$$magenta(M)+black(K)=black(K)$$

$$yellow(Y)+black(K)=black(K)$$

$$yellow(Y)+magenta(M)=red(R)$$

and if the occurrence part of a break in the additional write information set in magenta (M) or yellow (Y) is black (K) or red (R), it is determined that the area becomes an overlap area between used areas and the break occurs, and the portion is joined to generate recovered additional write information.

Next, at step S105, the additional write area specification part determination unit 405 extracts text information, image information as information included by the recovered additional write information. For example, original information (text information, image information) included by the additional write information 221 to 223 is extracted as shown in FIG. 5.

Next, at step S106, the additional write area specification part information analysis unit 406 and the analysis information storage unit 407 shown in FIG. 10 analyze the information (text information, image information) in the inclusive area of the additional write information and, for example, analyzes text information by executing OCR and stores image information in the storage section as image data.

In the processing flow shown in FIG. 11B, S201 and S202 are similar to S101 and S102 of the processing flow shown in FIG. 11A. At S201, a document image to be processed is input and at S202, colors are extracted from the input document image. In the processing flow shown in FIG. 11B, at S203, the color analysis unit 403 checks the subtractive color mixture combination for the colors extracted from the document at S202.

For example, if
black (K) as original information and
yellow (Y) and magenta (M) as additional write information are used, the color analysis unit 403 checks colors with a possibility of being generated by subtractive color mixture based on the used colors. In this case, the colors generated by subtractive color mixture are determined black (K) and red (R) from the following relational expressions:

$$magenta(M)+black(K)=black(K)$$

$$yellow(Y)+black(K)=black(K)$$

$$yellow(Y)+magenta(M)=red(R)$$

Next, at S204, the additional write area joining and integrating unit 404 references the subtractive color mixture combination analyzed at S203 and joins and integrates areas for each pixel. That is, if black (K) and red (R) areas are colors generated in plural colors by subtractive color mixture and the occurrence part of a break in the additional write information set in magenta (M) or yellow (Y) is black (K) or red (R), it is determined that the area becomes an overlap area between used areas and the break occurs, and the portion is joined to generate recovered additional write information.

S205 and S206 are similar to S105 and S106 of the processing flow shown in FIG. 11A. Information included by the recovered additional write information is extracted and the information in the inclusive area of the additional write information is analyzed and is stored in the storage section by the additional write area specification part information analysis unit 406 and the analysis information storage unit 407 shown in FIG. 10.

Next, the configuration of a second embodiment of the information processing apparatus of the invention will be discussed with reference to FIG. 12. An information processing apparatus 420 shown in FIG. 12 has data input unit 401, color extraction unit 402, color analysis unit 403, additional write area joining and integrating unit 404, additional write area specification part determination unit 405, additional write area specification part information analysis unit 406, and analysis information storage unit 407, like the information processing apparatus previously described with reference to FIG. 10. In addition to the components, the information processing apparatus 420 further has image processing unit 421 and limited color image generation unit 422.

As preprocessing of the input image to be processed, the image processing unit 421 performs difference extraction processing of extracting only additional write information from the difference between additional write image data added with a color marker and the original image before write is added or if the original document contains rule lines, performs processing of removing the rule lines, etc., for example.

The limited color image generation unit 422 performs processing of distributing the color information acquired from the document to be processed in the color extraction unit 402 only to specific colors, for example, used color information previously input to the information processing apparatus and colors with a possibility of being generated by subtractive color mixture. For example, if black (K) is used for original information and yellow (Y) and magenta (M) are used as additional write information, the color information acquired from the document to be processed in the color extraction unit 402 is distributed to the used colors and the color "red (R)" with a possibility of being generated by subtractive color mixture. That is, even if a color having a small error is detected due to a scanner read error, etc., the color is distributed to any of a small number of limited colors, whereby all information can be reliably extracted.

Processing examples in the information processing apparatus 420 having the configuration shown in FIG. 12 will be discussed with reference to the flowcharts of FIGS. 13 to 15. FIGS. 13 to 15 show six processing flows of 13A to 15B. The flows 13A to 14B shown in FIGS. 13 and 14 are processing to which processing of the image processing unit 421 is not applied in the information processing apparatus 420 shown in FIG. 12 and are processing using the data input unit 401, the color extraction unit 402, the limited color image generation unit 422, the color analysis unit 403, the additional write area joining and integrating unit 404, the additional write area specification part determination unit 405, the additional write area specification part information analysis unit 406, and the analysis information storage unit 407. The flows shown in FIGS. 15A and 15B are processing flows describing a processing sequence to which the image processing unit 421 is applied in addition to the components.

To begin with, the processing according to the flowchart of FIG. 13A will be discussed. First, at S301, the data input unit 401 shown in FIG. 12 inputs image data to be processed. For example, the image data is document image data with attributes set with different color markers, namely, checked with markers; data read through the scanner, image data stored in the storage section, or the like is input as the data to be processed.

At S302, the color extraction unit 402 and the limited color image generation unit 422 perform processing. First, the color extraction unit 402 extracts the colors used in the input image data. For example, black (K) used in original information and yellow (Y) and magenta (M) used as additional write information and further red (R) detected from additional write information overlap (for example, yellow (Y) and magenta (M)) and the like are extracted, and further a color area determined a color close to yellow (Y), magenta (M), or red (R) because of an error at the printing time or at the scanning time is also detected.

The limited color image generation unit 422 executes limited color conversion for determining that color areas containing a small error are a limited number of colors by limited color conversion. For example, processing of distributing color information only to the used color information previously input to the information processing apparatus and colors with a possibility of being generated by subtractive color mixture is performed. If black (K) is used for original information and yellow (Y) and magenta (M) are used as additional write information, the color information acquired from the document to be processed in the color extraction unit 402 is distributed to the used colors and the color "red (R)" with a possibility of being generated by subtractive color mixture.

At S303, the color analysis unit 403 checks the subtractive color mixture combination for the colors extracted from the limited color document generated at S302. For example, if black (K) as original information and yellow (Y) and magenta (M) as additional write information are used, the color analysis unit 403 checks colors with a possibility of being generated by subtractive color mixture based on the used colors. In this case, the colors generated by subtractive color mixture are determined black (K) and red (R) from the following relational expressions:

$$\text{magenta}(M)+\text{black}(K)=\text{black}(K)$$

$$\text{yellow}(Y)+\text{black}(K)=\text{black}(K)$$

$$\text{yellow}(Y)+\text{magenta}(M)=\text{red}(R)$$

Next, at S304, the additional write area joining and integrating unit 404 references the subtractive color mixture combination analyzed at S303 and joins and integrates areas for each pixel. That is, if black (K) and red (R) areas are colors generated in plural colors by subtractive color mixture and the occurrence part of a break in the additional write information set in magenta (M) or yellow (Y) is black (K) or red (R), it is determined that the area becomes an overlap area between used areas and the break occurs, and the portion is joined to generate recovered additional write information.

S305 and S306 are similar to S105 and S106 of the processing flow shown in FIG. 11A. Information included by the recovered additional write information is extracted and the information in the inclusive area of the additional write information is analyzed and is stored in the storage section by the additional write area specification part information analysis unit 406 and the analysis information storage unit 407 shown in FIG. 12.

In the processing flow shown in FIG. 13B, steps S401 to S403 are similar to S301 to S303 of the processing flow shown in FIG. 13A. In the processing flow shown in FIG. 13B, at step S404, the additional write area joining and integrating unit 404 references the subtractive color mixture combination analyzed at step S403 and joins and integrates areas for each pixel. That is, if black (K) and red (R) areas are colors generated in plural colors by subtractive color mixture and the occurrence part of a break in the additional write information set in magenta (M) or yellow (Y) is black (K) or red (R), it is determined that the area becomes an overlap area between used areas and the break occurs, and the portion is joined to generate recovered additional write information. To perform the processing, if the color area corresponding to the overlap color (subtractive color mixture) is larger than a predetermined value (threshold value), the additional write area joining and integrating unit 404 executes joining for each pixel and when arriving at the current pixel at the shortest distance, joins and integrates the color area.

Steps S405 and S406 are similar to S105 and S106 of the processing flow shown in FIG. 11A. Information included by the recovered additional write information is extracted and the information in the inclusive area of the additional write information is analyzed and is stored in the storage section by the additional write area specification part information analysis unit 406 and the analysis information storage unit 407 shown in FIG. 12.

Like the processing flows in FIG. 13, the processing flows shown in FIG. 14 are processing to which processing of the image processing unit 421 is not applied in the information processing apparatus 420 shown in FIG. 12 and are processing using the data input unit 401, the color extraction unit 402, the limited color image generation unit 422, the color analysis unit 403, the additional write area joining and integrating unit 404, the additional write area specification part determination unit 405, the additional write area specification part information analysis unit 406, and the analysis information storage unit 407.

First, the processing flow shown in FIG. 14A will be discussed. In the processing flow, S501 to S505 are similar to S301 to S305 of the processing flow shown in FIG. 13A. That is, at S501, the data input unit 401 inputs image data to be processed. At S502, the color extraction unit 402 extracts used colors and the limited color image generation unit 422 converts the extraction colors to limited colors. At S503, the color analysis unit 403 checks the subtractive color mixture combination for the colors extracted from the limited color image generated at S502.

Next, at S504, the additional write area joining and integrating unit 404 references the subtractive color mixture combination analyzed at S503 and joins and integrates for each area. Further, at S505, the included areas are determined by the recovered additional write information.

In the processing example, S506 differs from S306 in FIG. 13A. At S506, the additional write area specification part information analysis unit 406 shown in FIG. 12 acquires the areas touching and overlapping the recovered additional write information as well as the areas included by the recovered additional write information as analysis target information and analyzes, for example, executes character recognition (OCR) processing. The processing is based on the determination that the overlap area between additional write information and character information as original information, for example, is also contained in the information to which the attribute is given by the additional write information.

Next, the processing flow shown in FIG. 14B will be discussed. The processing flow in FIG. 14B is also executed in the information processing apparatus shown in FIG. 12. S601 to S605 are similar to S301 to S305 in the flowchart of FIG. 13A and S501 to S505 in the flowchart of FIG. 14A and therefore will not be discussed again.

Figure 14A:
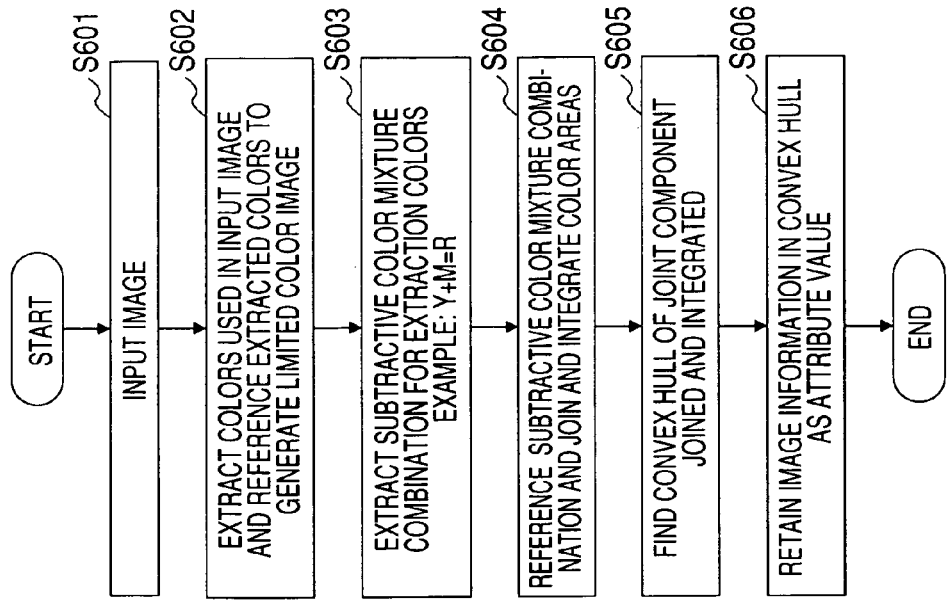
FIGS. 14A and 14B are flowcharts to describe processing sequences executed by the information processing apparatus of the invention.
Figure 14B:
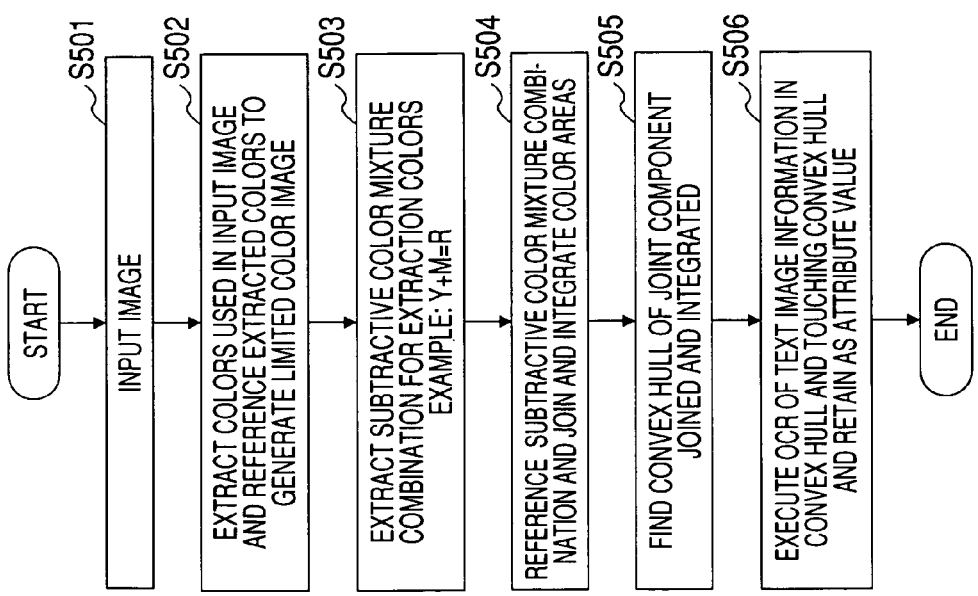
Figure 15A:
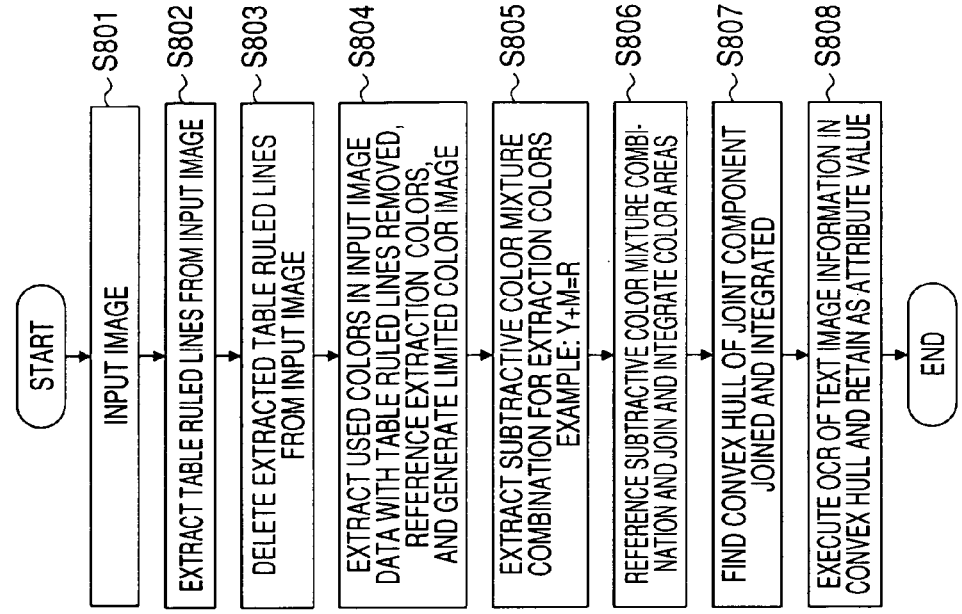
FIGS. 15A and 15B are flowcharts to describe processing sequences executed by the information processing apparatus of the invention.
Figure 15B:
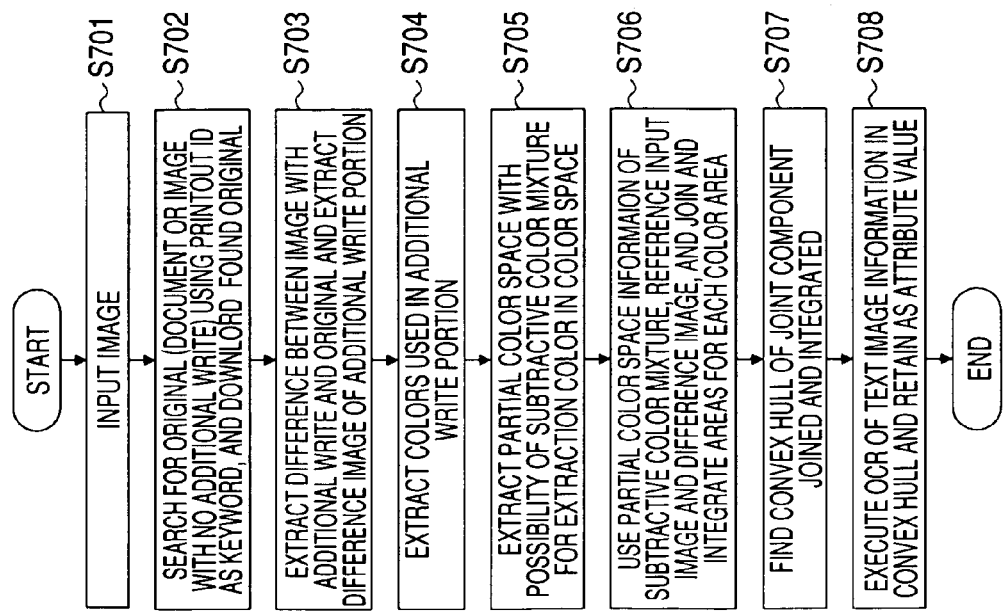

In the processing example, S606 differs from S306 in FIG. 13A and S506 in FIG. 14A. In the processing example, at S606, the additional write area specification part information analysis unit 406 and the analysis information storage unit 407 shown in FIG. 12 store image information in the inclusive area of additional write information in the storage section. In the processing flows described so far, character recognition processing (OCR) is executed for text image information and the information is converted into text data, for example, and then is stored in the storage section. In the processing example, however, image data in the area specified by additional write information is acquired and is stored in the storage section. In this case, the image data is stored in the storage section as the image data associated with a specific attribute.

Next, the processing flows shown in FIG. 15 will be discussed. The flows shown in FIGS. 15A and 15B are processing to which processing of the image processing unit 421 is applied in the information processing apparatus 420 shown in FIG. 12 and are processing using the data input unit 401, the image processing unit 421, the color extraction unit 402, the limited color image generation unit 422, the color analysis unit 403, the additional write area joining and integrating unit 404, the additional write area specification part determination unit 405, the additional write area specification part information analysis unit 406, and the analysis information storage unit 407.

To begin with, the processing flow shown in FIG. 15A will be discussed. First, at S701, the data input unit 401 shown in FIG. 12 inputs image data to be processed. For example, the image data is document image data with attributes set with different color markers, namely, checked with markers; data read through the scanner, image data stored in the storage section, or the like is input as the data to be processed.

Next, S702 and S703 are executed in the image processing unit 421. At S702, the image processing unit 421 searches the storage section of the information processing apparatus, the database connected through a network, or the like for the original (document or image with no additional write) using the identifier of the document to be processed, for example, the printout ID as a keyword, and inputs or downloads the found original.

For example, if the additional write document 202 shown in FIG. 4 is input as the image data to be processed, the original document 201 corresponding to the additional write document 202 is input. Further, at S703, the image processing unit 421 extracts the difference between the image with additional write and the original and extracts the difference image of the additional write portion. That is, for example, difference analysis between the additional write document 202 and the original document 201 shown in FIG. 4 is conducted for extracting the difference image of the additional write portion.

An outline of the difference extraction processing will be discussed. To being with, alignment processing of the two images of the original document image and the additional write document image is executed. As an alignment technique of two images, any of various existing techniques can be applied. Basically, similar feature areas are extracted from the images and are associated with each other. The shift amount between the two images is calculated based on the associated feature areas and the images are aligned while the image data is corrected based on the shift amount.

Next, the difference between the original document image data and the additional write document image data subjected to the alignment is extracted. In the processing, for example, the presence or absence of a difference between the coordinate position (x, Y) of the original document image data and the coordinate position (x, Y) of the additional write document image data is detected and only if a difference exists, the difference is assumed to be the additional write information for executing data extraction. As the processing is performed, the data not existing in the original document image data and existing only in the additional write document image data is extracted.

Next, at S704, the color extraction unit 402 extracts the used colors based on the difference image data. For example, if the colors used as the additional write information are yellow (Y), magenta (M), etc., yellow (Y) and magenta (M) are extracted.

Next, at S705, the color analysis unit 403 extracts a partial color space with a possibility of subtractive color mixture for each of the colors extracted at S704 in the color space (YMCK, GBR, etc.,). For example, if yellow (Y) and magenta (M) as additional write information are used, for example, extraction color 241 is set to yellow (Y) and magenta (M) in the color space shown in FIG. 7 (1) and each partial color space with a possibility of subtractive color mixture is found.

Next, at S706, the additional write area joining and integrating unit 404 uses partial color space information of subtractive color mixture, references the input image (additional write document) and the difference image, and joins and integrates the break of the additional write information. As described above, the relationship between the used color and the color generated by subtractive color mixture is, for example, $$yellow(Y)+magenta(M)=red(R)$$

If the color of the occurrence part of the break is red (R) based on the relational expression, it is determined that the area becomes an overlap area between the used areas and the break occurs, and the portion is joined to generate recovered additional write information.

S707 and S708 are similar to S105 and S106 of the processing flow shown in FIG. 11A. Information included by the recovered additional write information is extracted and the information in the inclusive area of the additional write information is analyzed and is stored in the storage section by the additional write area specification part information analysis unit 406 and the analysis information storage unit 407 shown in FIG. 12.

Next, a processing example according to the flowchart of FIG. 15B will be discussed. The processing flow shown in FIG. 15B is processing performed when the original document is a document containing ruled lines of table data, etc., for example; it is a sequence of executing processing by removing the ruled lines contained in an additional write document and eliminating extra data in the image processing unit 421 of the information processing apparatus 420 shown in FIG. 12.

To begin with, at S801, the data input unit 401 shown in FIG. 12 inputs image data to be processed. For example, the image data is document image data with attributes set with different color markers, namely, checked with markers; data read through the scanner, image data stored in the storage section, or the like is input as the data to be processed. The input data is an additional write document provided by giving attributes to an original document containing the ruled lines of a table, etc., for example, with color markers.

Next, S802 and S803 are executed in the image processing unit 421. The image processing unit 421 extracts table ruled lines from the input image (additional write document) at S802 and deletes the extracted table ruled lines at S803.

Next, at S804, the color extraction unit 402 extracts the used colors based on the image data with the ruled lines removed. For example, if the colors used as the additional write information are yellow (Y), magenta (M), etc., yellow (Y) and magenta (M) and further red (R), etc., are extracted. Further, the limited color image generation unit 422 converts the extraction colors to limited colors to generate a limited color image.

Next, at S805, the color analysis unit 403 checks the subtractive color mixture combination for the colors extracted from the limited color image generated at S804. Further, at S806, the additional write area joining and integrating unit 404 references the subtractive color mixture combination analyzed at S805 and joins and integrates areas for each pixel. Further, at S807, information included by the recovered additional write information is extracted and the information in the inclusive area of the additional write information is analyzed and is stored in the storage section at S808 by the additional write area specification part information analysis unit 406 and the analysis information storage unit 407 shown in FIG. 12.

Last, a hardware configuration example of the image processing apparatus of the invention will be discussed with reference to FIG. 16. The configuration shown in FIG. 16 is a hardware configuration example of an image processing apparatus implemented as a PC, etc., for example, including an image data read section 531 such as a scanner and a data output section 532 such as a printer.

A CPU (Central Processing Unit) 501 is a control section for executing processing following a program describing the execution sequence of the various types of data processing previously described in the embodiments, namely, the image processing, the color extraction processing, the limited color image generation processing, the color analysis processing, the additional write area joining and integrating processing, the additional write area specification part determination processing, the additional write area specification part information analysis processing, the analysis information storage processing, etc.

ROM (Read-Only Memory) 502 stores programs, operation parameters, etc., used by the CPU 501. RAM (Random Access Memory) 503 stores programs used in execution of the CPU 501, parameters changing appropriately in the execution of the CPU 501, and the like. They are connected by a host bus 504 implemented as a CPU bus, etc.

The host bus 504 is connected to an external bus 506 such as a PCI (Peripheral Component Interconnect/Interface) bus through a bridge 505.

A keyboard 508 and a pointing device 509 are input devices operated by the user. A display 510 is implemented as a liquid crystal display, a CRT (Cathode Ray Tube), or the like for displaying various pieces of information as text and image information.

An HDD (Hard Disk Drive) 511 contains a hard disk and drives the hard disk for recording or playing back a program and information executed by the CPU 501. The hard disk stores the original document as document, the additional write document to which the attribute values are given, data applied to color analysis processing based on subtractive color mixture, and the like. Further, the hard disk stores various data processing programs, various computer programs, etc.

A drive 512 reads data or a program recorded on a mounted removable record medium 521 such as a magnetic disk, an optical disk, a magneto-optical disk, or semiconductor memory, and supplies the data or the program to the RAM 503 connected through the interface 507, the external bus 506, the bridge 505, and the host bus 504. The removable record medium 521 can also be used as a data record area like a hard disk.

A connection port 514 is a port for connecting an external connection machine 522 and has a connection section of a USB, IEEE 1394, etc. The connection port 514 is connected to the CPU 501, etc., through the interface 507, the external bus 506, the bridge 505, the host bus 504, etc. A communication section 515 is connected to a network for executing data communication processing with an external system. A data read section 531 executes document read processing, and a data output section 532 executes document data output processing.

The hardware configuration example of the image processing apparatus shown in FIG. 16 is one system example and the image processing apparatus of the invention is not limited to the configuration shown in FIG. 16 and may be any if it can execute the processing previously described in the embodiments.

While the invention has been described in detail with reference to the specific embodiments, it is to be understood that modifications will be apparent to those skilled in the art without departing from the spirit and the scope of the invention. That is, the invention is disclosed for illustrative purposes only and it is to be understood that the invention is not limited to the specific embodiments thereof except as defined in the claims.

The processing sequence described in the specification can be executed by both or either of hardware and software. To execute software processing, the program recording the processing sequence can be installed in memory in a computer incorporated in dedicated hardware for execution or can be installed in a general-purpose computer that can execute various types of processing for execution.

For example, the program can be previously recorded on a hard disk or in ROM (Read-Only Memory) as a record medium or can be stored (recorded) temporarily or permanently on a removable record medium such as a flexible disk, a CD-ROM (Compact Disk Read-Only Memory), an MO (Magneto Optical) disk, a DVD (Digital Versatile Disk), a magnetic disk, or semiconductor memory. Such a removable record medium can be provided as a package software product.

The program not only can be installed in a computer from a removable record medium as described above, but also can be transferred by radio waves from a download site to a computer or can be transferred to a computer in a wired manner through a network such as the Internet for the computer to receive the program thus transferred and install the program on a record medium such as a hard disk incorporated.

The various types of processing described in the specification may be executed not only in time sequence according to the description, but also in parallel or individually in response to the processing capability of the apparatus for executing the processing or as required. The system in the specification is a logical set made up of plural units (apparatus) and is not limited to a set of units (apparatus) housed in a single cabinet.

As described above, for example, in the analysis processing of an additional write document involving additional write with color markers executed as attribute setting processing for a document, the image processing apparatus of the invention detects overlap among plural pieces of additional write information or overlap between additional write information and original information, analyzes which color combination the color of the overlap is generated in, recovers the additional write information broken in the overlap, and reliably reads specification information of the recovered additional write information. The image processing apparatus conducts information analysis of character recognition, etc., on the characters (text) contained in the specification information of the recovered additional write information and stores the analysis result in the database, etc. According to the configuration, for example, if overlap between different color markers or overlap between a color marker and original information occurs in an additional write document, it is made possible to extract precise additional write information and extract and analyze the information determined by the additional write information.

What is claimed is:

1. An information processing apparatus comprising:
    a color extraction unit that inputs an additional write document provided by writing additional write information to an original document in different colors and acquires color information on the additional write document;
    a color analysis unit that analyzes the correspondence between one of a color combination and color space generated by color mixture and the colors extracted by the color extraction unit based on the colors extracted by the color extraction unit;
    a joining and integrating unit that determines overlap between different colors on the additional write document based on the analysis result of the color analysis unit, and that joins the break of the additional write information corresponding to the correspondence portion between the overlap and the break of the additional write information;
    a determination unit that determines a specification area of the additional write document according to the additional write information joined in the joining and integrating unit; and
    an information analysis unit that reads information contained in the specification area analyzed by the determination unit.

2. The information processing apparatus as claimed in claim 1, wherein the color analysis unit extracts a partial color space with a possibility of subtractive color mixture in the color space based on the colors extracted by the color extraction unit.

3. The information processing apparatus as claimed in claim 1, wherein the color analysis unit extracts a subtractive color mixture combination corresponding to the colors extracted by the color extraction unit based on the colors extracted by the color extraction unit.

4. The information processing apparatus as claimed in claim 1, wherein the information analysis unit executes character recognition processing of the information contained in the specification area analyzed by the determination unit.

5. The information processing apparatus as claimed in claim 1, wherein the information analysis unit acquires the information contained in the specification area analyzed by the determination unit as image data.

6. The information processing apparatus as claimed in claim 1, wherein the information analysis unit reads information contained in the area included by one of the additional write information and information contained in the inclusive area and the areas overlapping with and touching the additional write information.

7. The information processing apparatus as claimed in claim 1, which comprises:
    an image processing unit that inputs an original document and an additional write document, and that executes difference extraction,
    wherein
    the color extraction unit acquires color information on difference image data generated by the image processing unit.

8. The information processing apparatus as claimed in claim 1, which comprises:
    an image processing unit that inputs an additional write document and removing a ruled line on the additional write document, wherein
the color extraction unit acquires color information on ruled line removal image data generated by the image processing unit.

9. The information processing apparatus as claimed in claim 1, which comprises:
an image generation unit that generates a limited color image limited to plural preset color information pieces based on the color information extracted by the color extraction unit,
wherein
the color analysis unit analyzes the correspondence between one of a color combination and color space generated by color mixture and the colors extracted by the color extraction unit based on the limited color image generated by the limited color image generation unit.

10. An information processing method comprising:
reading through a scanner an additional write document provided by writing additional write information to an original document in different colors;
detecting with the scanner color information on the additional write document;
storing in a storage unit a correspondence table between the color information detected by the scanner and plural used colors contained in the detected color information;
analyzing with a processing unit the plural used colors based on the detector color information using the correspondence table in the storage unit;
determining with the processing unit overlap between different colors on the additional write document based on an analysis result obtained by analyzing;
joining the break of the additional write information corresponding to the correspondence portion between the overlap and the break of the additional write information;
determining a specification area of the additional write document according to the additional write information joined; and
using OCR to read information contained in the specification area analyzed.

11. The information processing method as claimed in claim 10, wherein the analyzing of the correspondence is extracting a partial color space with a possibility of subtractive color mixture in the color space based on the colors extracted.

12. The information processing method as claimed in claim 10, wherein the analyzing of the correspondence is extracting a subtractive color mixture combination corresponding to the colors extracted based on the colors extracted.

13. The information processing method as claimed in claim 10, wherein the reading of the information is executing character recognition processing of the information contained in the specification area analyzed.

14. The information processing method as claimed in claim 10, wherein the reading of the information is acquiring the information contained in the specification area analyzed as image data.

15. The information processing method as claimed in claim 10, wherein the reading of the information is reading information contained in the area included by one of the additional write information and information contained in the inclusive area and the areas overlapping with and touching the additional write information.

16. The information processing method as claimed in claim 10, which comprises:
inputting an original document and an additional write document; and
executing difference extraction,
wherein
the acquiring of the color information is acquiring color information on difference image data generated.

17. The information processing method as claimed in claim 10, which comprises:
inputting an additional write document; and
removing a ruled line on the additional write document,
wherein
the acquiring of the color information is acquiring color information on ruled line removal image data generated.

18. The information processing method as claimed in claim 10, which comprises:
generating a limited color image limited to plural preset color information pieces based on the color information extracted,
wherein
the analyzing of the correspondence is analyzing the correspondence between one of a color combination and a color space generated by color mixture and the colors extracted based on the limited color image.

19. A non-transitory computer readable medium storing a computer readable program for causing a computer to execute a process for executing a document analysis processing, which comprises:
inputting an additional write document provided by writing additional write information to an original document in different colors;
acquiring color information on the additional write document;
analyzing a correspondence between one of a color combination and a color space generated by color mixture and the colors extracted unit based on the colors extracted;
determining overlap between different colors on the additional write document based on an analysis result obtained by analyzing;
joining the break of the additional write information corresponding to the correspondence portion between the overlap and the break of the additional write information;
determining a specification area of the additional write document according to the additional write information joined; and
reading information contained in the specification area analyzed.

* * * * *